US012805537B2

(12) United States Patent
Lemmens et al.

(10) Patent No.: US 12,805,537 B2
(45) Date of Patent: Nov. 24, 2026

(54) INCREASING STABILITY OF LC-PUFA

(71) Applicant: AAK AB (PUBL), Malmö (SE)

(72) Inventors: Karlijn K.E. Lemmens, CT Amsterdam (NL); Martinus M.M. Vissers, EL Bussum (NL)

(73) Assignee: AAK AB (PUBL), Malmö (SE)

( * ) Notice: Subject to any disclaimer, the term of this patent is extended or adjusted under 35 U.S.C. 154(b) by 1036 days.

(21) Appl. No.: 17/612,385

(22) PCT Filed: May 19, 2020

(86) PCT No.: PCT/SE2020/050519
§ 371 (c)(1),
(2) Date: Nov. 18, 2021

(87) PCT Pub. No.: WO2020/236075
PCT Pub. Date: Nov. 26, 2020

(65) Prior Publication Data
US 2022/0248701 A1 Aug. 11, 2022

(30) Foreign Application Priority Data
May 20, 2019 (SE) .................................. 1950596-5

(51) Int. Cl.
*A23B 20/30* (2025.01)
*A23D 9/013* (2006.01)

(52) U.S. Cl.
CPC ............. *A23B 20/30* (2025.01); *A23D 9/013* (2013.01)

(58) Field of Classification Search
CPC ................................ A23B 20/30; A23D 9/013
See application file for complete search history.

(56) References Cited

U.S. PATENT DOCUMENTS

2004/0116512 A1* 6/2004 Naguib .................. A61P 27/02 514/458
2007/0141211 A1 6/2007 Kolar et al.
2008/0020033 A1 1/2008 Kawashima et al.
2009/0156487 A1* 6/2009 Zwijsen ................ A61K 35/20 426/601
2011/0105433 A1* 5/2011 Braun .................... A61P 43/00 426/601
2012/0107478 A1 5/2012 Lee et al.
(Continued)

FOREIGN PATENT DOCUMENTS

JP 2006-298969 A 11/2006

OTHER PUBLICATIONS

Gruger., "Fatty Acid Composition of Fish Oils". from a US Fish and Wildlife Services report published in the mid 1960's. Available online at https://spo.nmfs.noaa.gov/Circulars/CIRC276.pdf in 2014. (Year: 2014).*
(Continued)

*Primary Examiner* — Erik Kashnikow
*Assistant Examiner* — Assaf Zilbering
(74) *Attorney, Agent, or Firm* — Finnegan, Henderson, Farabow, Garrett & Dunner LLP

(57) ABSTRACT

The present invention relates to the field of increasing the stability of Long Chain Polyunsaturated Fatty Acids (LC-PUFA) thereby making handling and transport easier and improving the shelf-life of the product.

19 Claims, 4 Drawing Sheets

*Changes in concentration of DHA (as a percentage of the initial value) over 12 months, samples stored at room temperature*

(56) References Cited

U.S. PATENT DOCUMENTS

| | | | |
|---|---|---|---|
| 2013/0059768 A1 | 3/2013 | Hallaraker et al. | |
| 2018/0125898 A1* | 5/2018 | Ben-Dror | A23L 33/105 |

OTHER PUBLICATIONS

Butina et al., "Comparative Analysis of the Physiological Value of Lecithins Obtained From Different Types of Raw Materials". Journal of Pharmaceutical Sciences and Research vol. 9(12), 2017, 2493-2497. (Year: 2017).*

International Search Report for International Application No. PCT/SE2020/050519, dated Jun. 30, 2020.

Written Opinion of the International Search Authority for International Application No. PCT/SE2020/050519.

* cited by examiner

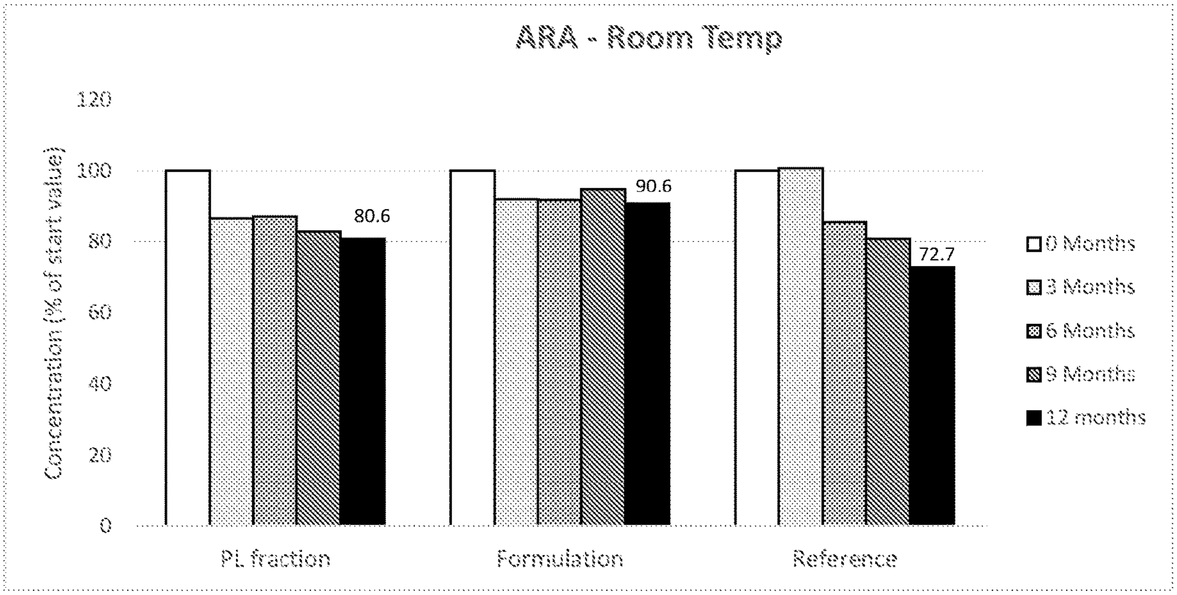
*Figure 1: Changes in concentration of ARA (as a percentage of the initial value) over 12 months, samples stored at room temperature*
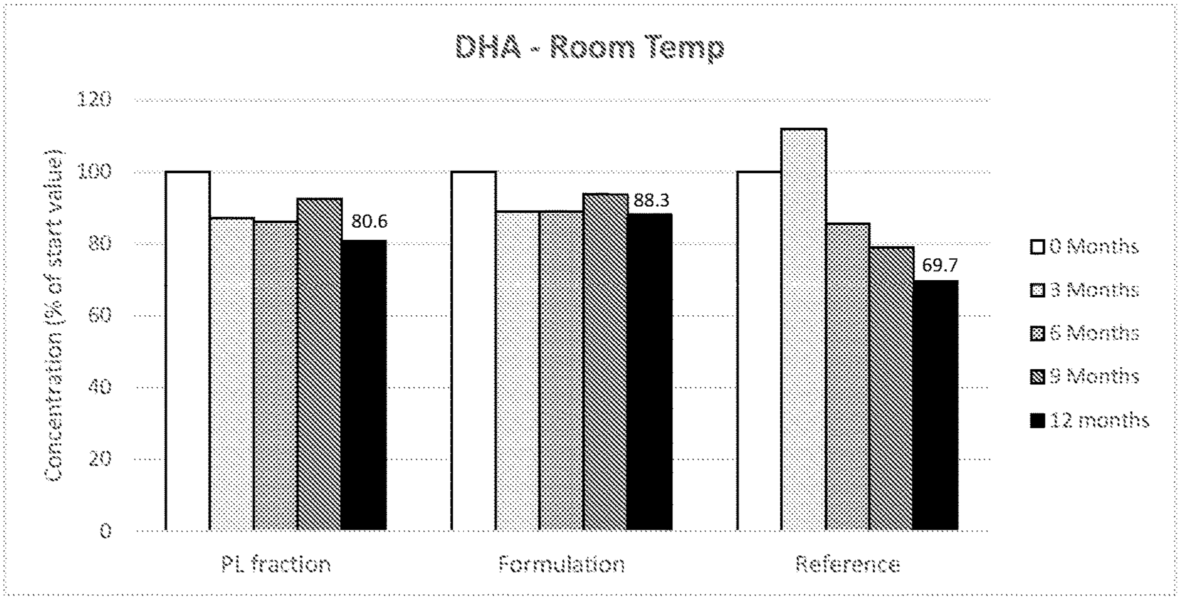
*Figure 2: Changes in concentration of DHA (as a percentage of the initial value) over 12 months, samples stored at room temperature*

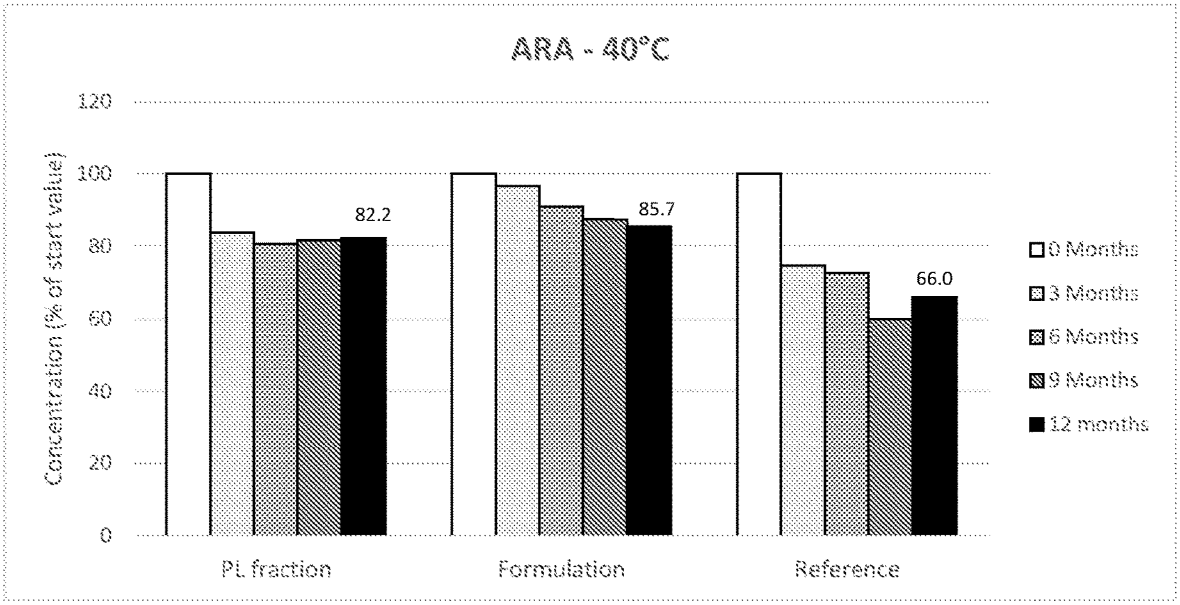
*Figure 3: Changes in concentration of ARA (as a percentage of the initial value) over 12 months, samples stored at 40°C*
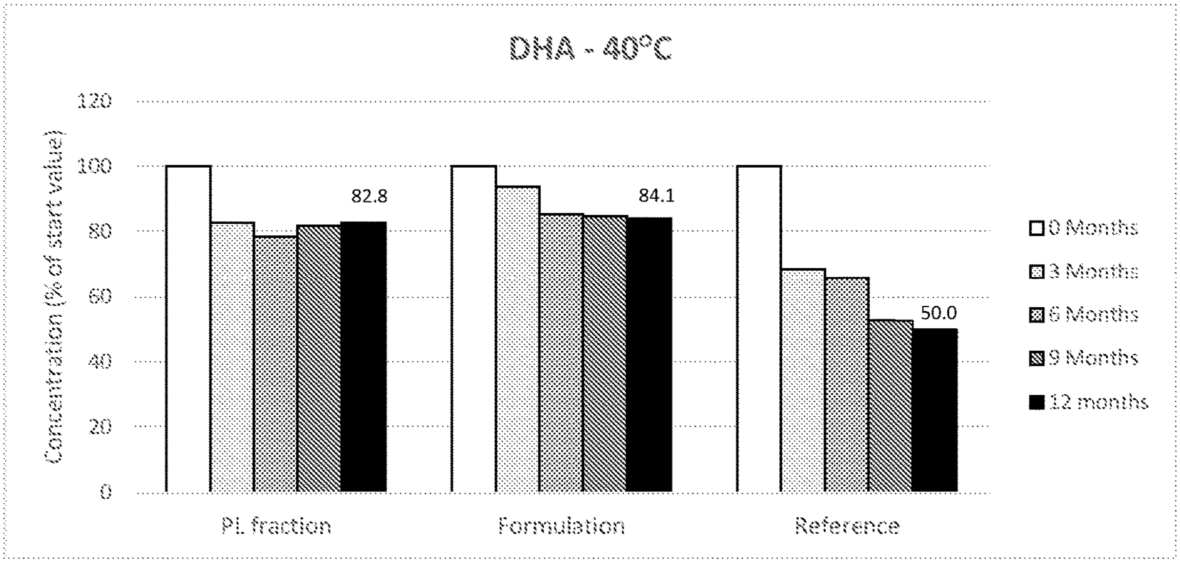
*Figure 4: Changes in concentration of DHA (as a percentage of the initial value) over 12 months, samples stored at 40°C*

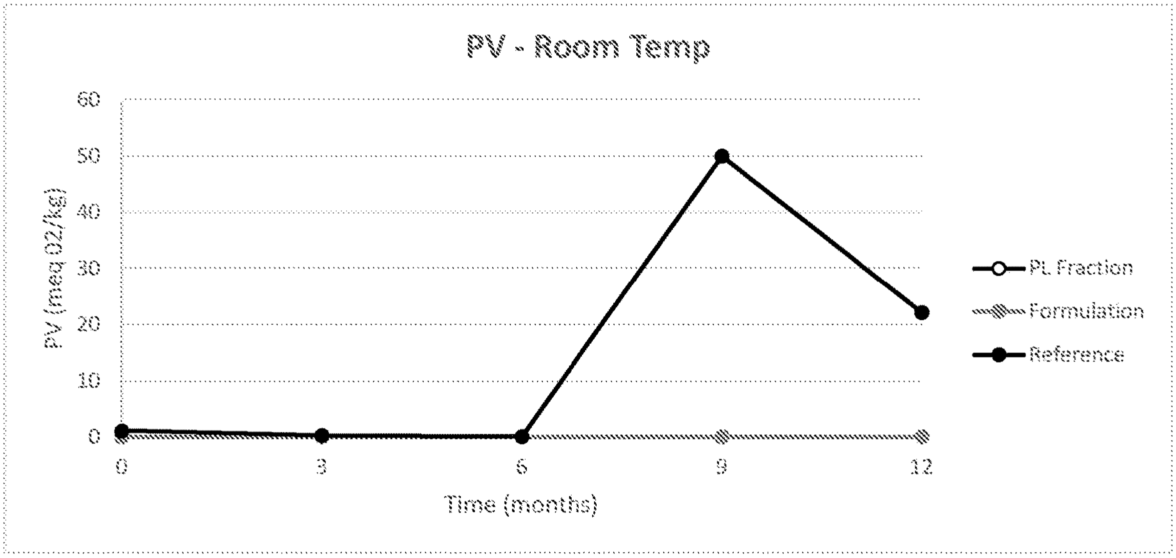
*Figure 5: Changes in peroxide value over 12 months, samples stored at room temperature*
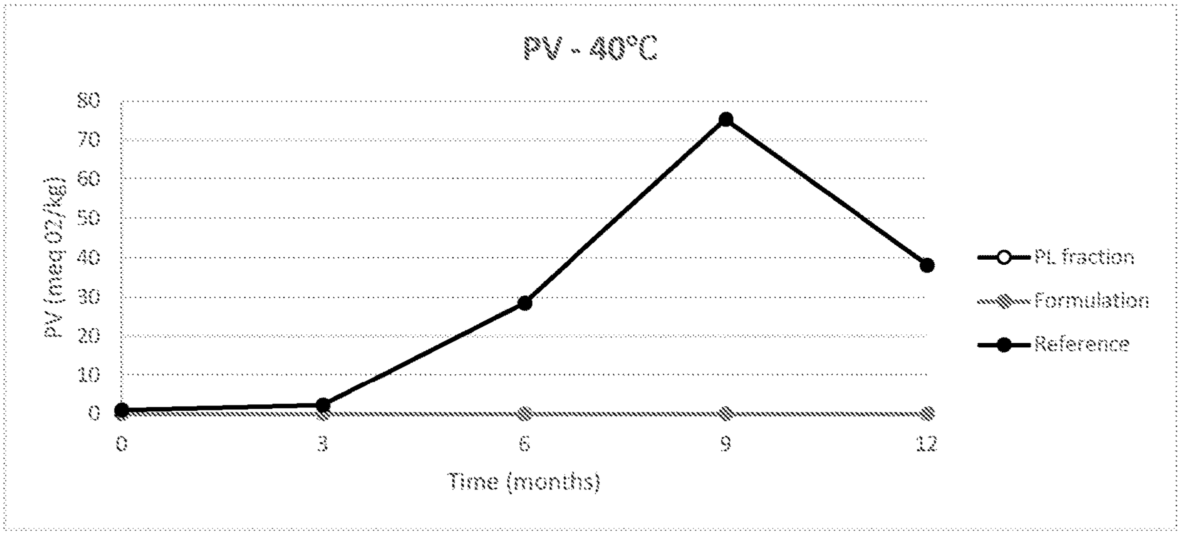
*Figure 6: Changes in peroxide value over 12 months, samples stored at 40°C*

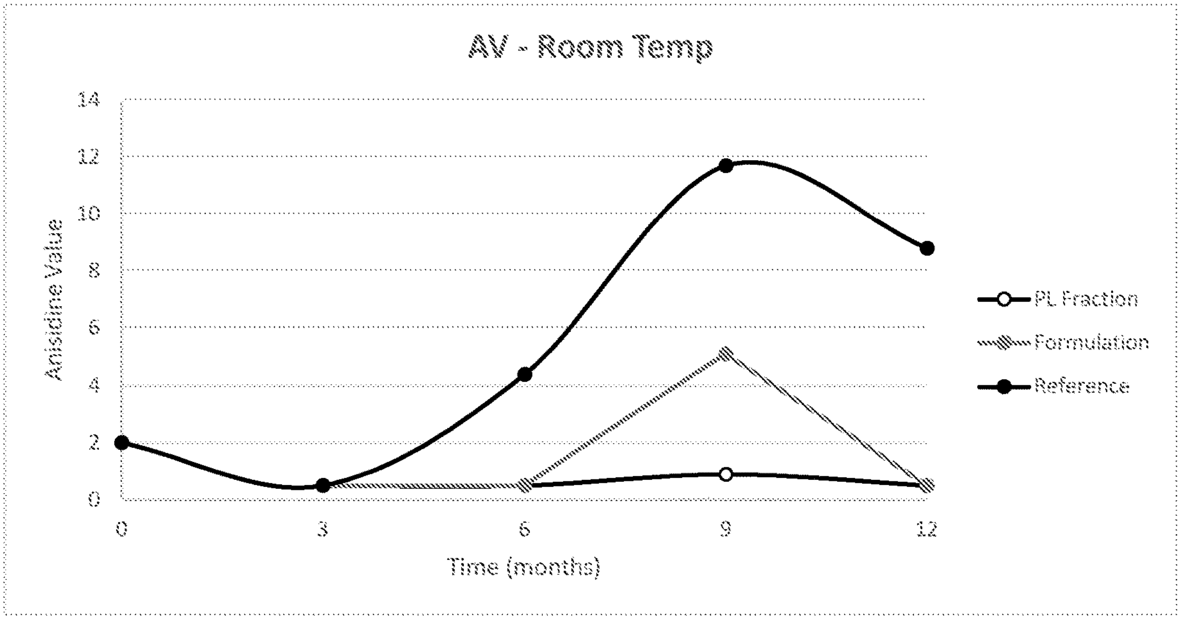
*Figure 7: Changes in Anisidine value over 12 months, samples stored at room temperature*
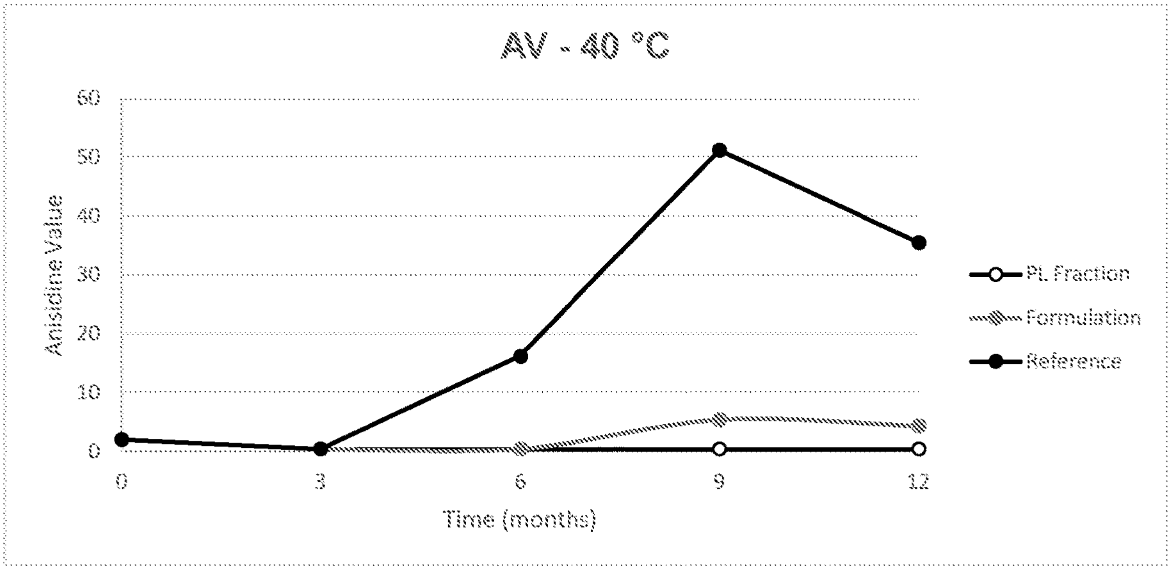
*Figure 8: Changes in Anisidine value over 12 months, samples stored at 40°C*

INCREASING STABILITY OF LC-PUFA

This application is a national stage filing under 35 U.S.C. § 371 of International Application No. PCT/SE2020/050519, filed on May 19, 2020, which claims the benefit of the filing date of Swedish Patent Application No. 1950596-5, filed on May 20, 2019, each of which is incorporated herein by reference in its entirety.

TECHNICAL FIELD

The present invention relates to the field of increasing the stability of Long Chain Polyunsaturated Fatty Acids (LC-PUFA) thereby making handling and transport easier and improving the shelf-life of the product.

BACKGROUND

The importance of Long Chain Polyunsaturated Fatty Acids (LC-PUFA) in the diet of humans and particularly infants is now well established. Typical dietary sources of LC-PUFA are organ meats, fish, eggs and human breast milk. However, present day diets are frequently deficient in LC-PUFA, resulting in a need to supplement the diet with a source of LC-PUFA. LC-PUFA oils and especially DHA, EPA and ARA oil are however very susceptible to oxidation. Anti-oxidants are commonly used to stabilize the oils, but the interest from the consumers to move towards more natural sources of food items makes this addition not always advantageous. To prevent oxidation, LC-PUFA oils are often stored and transported frozen and still have a limited shelf life. This obviously makes handling of the oils more difficult because of the complications associated with freezing and thawing of the oils.

LC-PUFA containing food products tends to develop an off-flavour which have been attempted to be avoided by many. US2011/0105433 relates to the prevention of fishy odor and off-flavours in LC-PUFA containing oil. The disclosed method do so by adding lecithin to the LC-PUFA containing oil at a weight ratio of lecithin to LC-PUFA of at least about 25:75. The document does not relate to increased stability of the LC-PUFA oil and also does not disclose the use of the amount of polar lipid fraction as used in the present invention.

There is thus a need for a composition comprising LC-PUFA which can be stored at temperatures from 0-45° C. and at the same time keep the stability for a prolonged period of time. The present invention addresses such needs and interests.

SUMMARY

In one aspect the present invention relates to a composition comprising a polar lipid fraction and a LC-PUFA containing fraction, wherein in the composition at least 50 wt % is said polar lipid fraction and at least 5 wt % is said LC-PUFA containing fraction and wherein said composition comprises at least 5 wt % of phospholipids.

Further embodiments are wherein the polar lipid fraction of said composition comprises phospholipids which are selected from the group consisting of: vegetable phospholipid, marine phospholipid, animal phospholipid, and single cell organism phospholipid or mixtures thereof.

Further embodiments are wherein the vegetable phospholipid in said polar lipid fraction is obtained from soybean, sunflower or rapeseed.

Further embodiments are wherein the marine phospholipid in said polar lipid fraction is obtained from krill, or fish.

Further embodiments are wherein the animal phospholipid in said polar lipid fraction is egg phospholipid obtained from chicken and/or duck, and/or milk phospholipid from cow and/or goat.

Further embodiments are wherein the single cell organism phospholipid in said polar lipid fraction is obtained from algae, bacteria or fungus.

Further embodiments are wherein the phospholipid is egg phospholipid from chicken.

Further embodiments are wherein the LC-PUFA containing lipid fraction comprises LC-PUFA selected from the group consisting of: Eicosadienoic acid, Eicosatrienoic acid, Eicosapentaenoic acid (EPA), Arachidonic acid (ARA), Docosadienoic acid, Docosatetraenoic acid, Docosapentaenoic acid, Docosahexaenoic acid (DHA), preferably LC-PUFA selected from the group consisting of: EPA, ARA and DHA.

Further embodiments are wherein the composition also comprises minor amounts of cholesterol, free fatty acids and/or anti-oxidants or additives.

In one aspect of the invention the LC-PUFA contained in said LC-PUFA containing lipid fraction has increased stability, preferably in temperatures ranging from 0-45 degrees Celsius.

Further aspects of the invention are use of the composition of the invention for increasing stability of LC-PUFA in the production of a product comprising LC-PUFA.

Still further aspects of the invention are a product comprising a composition of the invention, said product being a LC-PUFA containing raw material or a food product comprising a LC-PUFA containing raw material.

BRIEF DESCRIPTION OF DRAWINGS

FIG. 1 depicts changes in concentration of ARA (as a percentage of the initial value) over 12 months. Tested samples were stored at room temperature.

FIG. 2 depicts changes in concentration of DHA (as a percentage of the initial value) over 12 months. Tested samples were stored at room temperature.

FIG. 3 depicts changes in concentration of ARA (as a percentage of the initial value) over 12 months. Tested samples were stored at 40°C.

FIG. 4 depicts changes in concentration of DHA (as a percentage of the initial value) over 12 months. Tested samples were stored at 40°C.

FIG. 5 depicts changes in peroxide value over 12 months. Tested samples were stored at room temperature.

FIG. 6 depicts changes in peroxide value over 12 months. Tested samples were stored at 40°C.

FIG. 7 depicts changes in Anisidine over 12 months. Tested samples were stored at room temperature.

FIG. 8 depicts changes in Anisidine over 12 months. Tested samples were stored at 40°C.

DETAILED DESCRIPTION

Definitions

As used herein, the singular forms “a”, “an” and “the” include plural referents unless the context clearly dictates otherwise.

As used herein, “at least one” is intended to mean one or more, i.e. 1, 2, 3, 4, 5, 6, 7, 8, 9, 10, etc.

As used herein "edible" is something that is suitable for use as food or as part of a food product, such as a dairy, confectionary, culinary, bakery or nutritional product. An edible fat is thus suitable for use as fat in food or food product and an edible composition is a composition suitable for use in food or a food product, such as for example a confectionary, bakery, dairy, culinary or nutritional product.

The term "vegetable oil" is intended to mean an oil or fat originating from a plant. Thus, a vegetable fat or vegetable triglycerides are still to be understood as vegetable fat or oil or vegetable triglycerides after fractionation, hydrogenation and/or interesterification etc.

The term "non-vegetable" in the context of "non-vegetable triglyceride" or "non-vegetable fat" when used herein is intended to mean obtained from other sources than vegetable oils Examples of non-vegetable triglycerides may for example be, but are not limited to, triglycerides obtained from unicellular organisms, such as single cell oils, or animal sources.

As used herein, "%" or "percentage" relates to weight percentage i.e. wt. % or wt.-% if nothing else is indicated.

As used herein, "vegetable oil" and "vegetable fat" are used interchangeably, unless otherwise specified.

As used herein the term "single cell oil" shall mean oil from oleaginous microorganisms which are species of yeasts, molds (fungal), bacteria and microalgae. These single cell oils are produced intracellular and in most cases during the stationary growth phase under specific growth conditions (e.g. under nitrogen limitation with simultaneous excess of a carbon source). Examples of oleaginous microorganisms are, but not limited to, *Mortierella alpina, Yarrowia lipolytica, Schizochytrium species, Nannochloropsis, Chlorella* species, *Crypthecodinium cohnii, Shewanella.*

The term "comprising" or "to comprise" is to be interpreted as specifying the presence of the stated parts, steps, features, or components, but does not exclude the presence of one of more additional parts, steps, features, or components.

As used herein, the term "and/or" is intended to mean the combined ("and") and the exclusive ("or") use, i.e. "A and/or B" is intended to mean "A alone, or B alone, or A and B together". For example, in the context "the animal phospholipid is egg phospholipid obtained from chicken and/or duck" it is thus intended to mean "the animal phospholipid is egg phospholipid obtained from chicken", "the animal phospholipid is egg phospholipid obtained from duck" or "the animal phospholipid is egg phospholipid obtained from chicken and duck".

As used herein, the term "fatty acid" encompasses free fatty acids and fatty acyl residues in triglycerides or phospholipids depending on the context.

As used herein, the term "triglycerides" may be used interchangeably with the term "triacylglycerides" and should be understood as an ester derived from glycerol and three fatty acids. "Triglycerides" may be abbreviated TG or TAG. A single triglyceride molecule, having a specific molecular formula, is of either vegetable or non-vegetable origin. Some triglycerides may be obtained from both vegetable and/or non-vegetable sources.

As used herein, the term "phospholipid" is intended to mean a type of lipid molecule that is made up of two fatty acids, a phosphate group, and a glycerol molecule. Phospholipids are known as the main component of the cell membrane. When many phospholipids line up, they form a double layer that is characteristic of all cell membranes. Phospholipids are found in many animal and plant sources, including in single cell organisms like algae. In the food industry the most common origin of phospholipids is egg yolk, soy lecithin and sunflower lecithin which contain a natural high amount of phospholipids.

The Composition

The composition of the present invention comprises a polar lipid fraction and a LC-PUFA containing fraction, wherein in the composition at least 50 wt % is said polar lipid fraction and at least 5 wt % is said LC-PUFA containing fraction and wherein said composition comprises at least 5 wt % of phospholipids.

The term "polar lipid fraction" is intended to mean the fraction of the composition consisting of polar lipid molecules, e.g. phospholipids. The phospholipids present in the polar lipid fraction may be all the same or it may be a mixture of different phospholipids.

Phospholipids in the present invention may be selected from the group consisting of: vegetable phospholipid, marine phospholipid, animal phospholipid, and single cell organism phospholipid or mixtures thereof.

In one embodiment the phospholipid is a vegetable phospholipid and is obtained from soybean, sunflower or rapeseed. In another embodiment the phospholipid is a marine phospholipid and is obtained from krill, or fish. In yet another embodiment the phospholipid is an animal phospholipid such as egg phospholipid obtained from chicken and/or duck, and/or milk phospholipid from cow and/or goat. In another embodiment the phospholipid is from a single cell organism phospholipid and is obtained from algae, bacteria or fungus.

In a preferred embodiment the phospholipid is egg phospholipid from chicken.

The composition of the invention may comprise one or more types of phospholipids, which may come from one or more sources of phospholipids.

In the present invention the composition comprises at least 50 wt % of said polar lipid fraction, such as at least 55 wt %, such as at least 60 wt %, such as at least 70 wt %, such as at least 80 wt %, such as at least 90 wt %, such as at least 95 wt %. In another embodiment said composition comprises from 50 to 95 wt % of said polar lipid fraction, such as from 50 to 90 wt %, such as from 50 to 80 wt %, such as from 50 to 70 wt %, such as from 50 to 60 wt %. In yet another embodiment said composition comprises from 60 to 95 wt % of said polar lipid fraction, such as from 70 to 95 wt %, such as from 80 to 95 wt %, such as from 90 to 95 wt %.

In said polar lipid fraction the amount of phospholipid is from 10 to 80% by weight of said polar lipid fraction, such as from 10 to 70% by weight, such as from 10 to 60% by weight, such as from 10 to 50% by weight, such as from 10 to 40% by weight, such as from 10 to 30% by weight, such as from 10 to 20% by weight of said polar lipid fraction. In a preferred embodiment the amount of phospholipid in said polar lipid fraction is from 28 to 38% by weight of said polar lipid fraction, more preferable from 30 to 38% by weight, such as from 32 to 36% by weight of said polar lipid fraction.

The skilled person will know that said polar lipid fraction with a phospholipid content of above 60 wt % phospholipid (determined as acetone-insoluble matter) is also called a lecithin. Lecithins are known in the art as anti-oxidants providing stability in certain compositions comprising LC-PUFA. However, in the art when lecithins are used as anti-oxidants the amount added is low and no more than 1 wt % typically, which is well below the amount of the polar lipid fraction added in the present invention. The stability provided in the composition of the present invention is something unrelated to this.

The term “LC-PUFA containing oil fraction” is intended to mean the fraction of the composition consisting of triglycerides with Long Chain Polyunsaturated fatty acids (LC-PUFA) attached to the glycerol. The triglycerides present in the oil fraction may be all the same or it may be a mixture of different triglycerides.

In the present invention the composition comprises at least 5 wt % of said LC-PUFA containing fraction, such as at least 10 wt %, such as at least 20 wt %, such as at least 30 wt %, such as at least 40 wt %, such as at least 50 wt %. In another embodiment said composition comprises from 5 to 50 wt % of said LC-PUFA containing lipid fraction, such as from 5 to 40 wt %, such as from 5 to 30 wt %, such as from 5 to 20 wt %, such as from 5 to 20 wt %. In yet another embodiment said composition comprises from 10 to 50 wt % of said LC-PUFA containing lipid fraction, such as from 20 to 50 wt %, such as from 30 to 50 wt %, such as from 40 to 50 wt %.

In said LC-PUFA containing fraction the amount of LC-PUFA is from 20 to 80% by weight of said LC-PUFA containing fraction, such as from 20 to 70% by weight, such as from 20 to 60% by weight, such as from 20 to 50% by weight, such as from 20 to 40% by weight, such as from 20 to 30% by weight of said LC-PUFA containing fraction.

In one embodiment, the composition comprises from 50 to 95 wt % of a polar lipid fraction containing from 10 to 80 wt % phospholipids, from 5 to 50 wt % is a LC-PUFA containing fraction containing from 20 to 80 wt % LC-PUFA, wherein the composition comprises from 5 to 80 wt % phospholipids.

In one embodiment, the composition comprises from 73 to 83 wt % of a polar lipid fraction containing from 28 to 38 wt % phospholipids, from 17 to 27 wt % of a LC-PUFA containing fraction containing from 45 to 55 wt % LC-PUFA, wherein the composition comprises from 20 to 32 wt % phospholipids.

The LC-PUFA comprised in said LC-PUFA containing fraction may be selected from the group consisting of: Eicosadienoic acid, Eicosatrienoic acid, Eicosapentaenoic acid (EPA), Arachidonic acid (ARA), Docosadienoic acid, Docosatetraenoic acid, Docosapentaenoic acid, Docosahexaenoic acid (DHA). Preferably, the LC-PUFA is selected from the group consisting of: EPA, ARA and DHA.

Long chain polyunsaturated fatty acids (LC-PUFA) is in one embodiment part of the fatty acids attached to the triglycerides. LC-PUFA are important components of membrane lipids and act as signaling molecules via various mechanisms, such as modulating gene expression and being precursors for eicosanoids and docosanoids. The most well-known and important LC-PUFAs are eicosapentanoic (EPA, 20:5 n-3), docosahexaenoic (DHA, 22:6 n-3) and arachidonic acid (ARA, 20:4 n-6).

WHO generally recommends daily consumption of 250 mg eicosapentanoic acid (EPA) and docosahexaenoic acid (DHA) for adults, while pregnant and lactating women should consume 300 mg/day, of which at least 200 mg should be DHA. For infants aged 0-6 months, an adequate intake is set at 0.2-0.3 E % (Energy %) for ARA and 0.1-0.18 E % for DHA. Since it is rather difficult to reach an adequate intake of LC-PUFA based on a normal diet, most people will benefit from a daily supplement of LC-PUFA. For exclusively formula-fed infants this supplement is recommended unless the infant formula used is an LC-PUFA supplemented formula.

Many different natural sources exist for LC-PUFA. In the present invention the LC-PUFA may be obtained from any natural source of LC-PUFA. The source of the LC-PUFA containing lipid fraction is not critical to the present invention. Any such source that is known in the art can be used. The skilled person generally knows sources of unsaturated fatty acids. Typical sources of DHA are for example fish oil or oils from microorganisms, such as *Crypthecodinium cohnii*. A typical source of ARA for example is biomass of fermentation process (e.g. *Mortierella alpina*). If very pure preparations are desired it may be advantageous to prepare the LC-PUFA containing lipid fraction synthetically and/or from Genetically Modified Organisms (GMO). However, generally it is preferred that the LC-PUFA containing lipid fraction is obtained from natural sources selected from the group consisting of marine oil, an oil produced from a single cell organism, an oil of animal origin or mixtures thereof.

LC-PUFA containing oils are very susceptible to oxidation because of their degree of unsaturation. Preserving the double bonds of the LC-PUFA through processing and distribution of food products comprising LC-PUFA is a critical issue. Traditionally this problem has been sought solved by the addition of anti-oxidants to the food product. The present invention solves this issue in a different and surprising way, as also demonstrated in the example herein below.

In a certain embodiment of the present invention it may be further advantageous if the composition of the invention further comprises an antioxidant. The type of antioxidant is not critical, however in the case where the composition is to be used in a food product or a medicament a food grade antioxidant is required. Antioxidants may help further to prevent oxidation of the LC-PUFA. Examples of suitable antioxidants include alpha-tocopherol, mixed tocopherols, ascorbyl palmitate, rosemary extract, citric acid and/or mixtures thereof.

The amount of antioxidant that can be used in the present invention depends on the type of antioxidant used. Those skilled in the art will be able to determine the amount to use. However, generally it is preferred if the antioxidant is added to the composition in an amount of about 0.001-1 wt %, preferable of about 0.01-0.5 wt % with respect to the total composition.

The composition of the invention may also comprise minor amounts of cholesterol, free fatty acids and/or suitable additives.

The composition of the invention comprises at least 5 wt % phospholipids, such as at least 10 wt %, such as at least 15 wt %, such as at least 20 wt %, such as at least 30 wt %, such as at least 40 wt %, such as at least 50 wt %, such as at least 60 wt %, such as at least 70 wt %. In another embodiment said composition comprises from 5 to 80 wt % phospholipid, such as from 5 to 75 wt %, such as from 5 to 70 wt %, such as from 5 to 60 wt %, such as from 5 to 50 wt %, such as from 5 to 40 wt %, such as from 5 to 30 wt %, such as from 5 to 20 wt %, such as from 5 to 10 wt %. In yet another embodiment said composition comprises from 10 to 80 wt % phospholipid, such as from 20 to 80 wt %, such as from 30 to 80 wt %, such as from 40 to 80 wt %, such as from 50 to 80 wt %, such as from 50 to 80 wt %, such as from 60 to 80 wt %, such as from 70 to 80 wt %.

The composition of the invention can be, depending on the use of said composition, be provided in liquid, semi-liquid or powder form. The form is considered to be semi-liquid when the form is intermediate in properties, especially in viscosity and flow properties, i.e. having properties between liquid and solid form. The skilled person will know how to determine whether a form is liquid, semi-liquid or solid using methods known in the art. One way to determine if e.g. a form is liquid or semi-liquid is to measure the viscosity, i.e. measure the resistance to motion under an applied force. This can be done easily by the person skilled in the art e.g. by using a Rheometer.

Stability

Stability can be evaluated using different methods. For this invention the peroxide value (which determines the concentration of hydroperoxide) can be measured using a standard method (e.g. DIN EN ISO 3960). The Anisidine value can be measured using a standard method (e.g. VDLUFA Bd. III, 5.4.1). The LC-PUFA content in g/100 g fatty acids can also easily be determined using standard methods (e.g. NF EN ISO 12966-2). A peroxide value below approximately 5 meq $O_2$/kg is in the present invention considered to be stable when measuring a semi-liquid form of the composition of the invention. The skilled person will know that stability in general and oxidative stability specifically can be measured in a variety of ways. For example, the peroxide value, i.e. the content of oxygen as peroxide in a formulation, can be measured using a standard method in the art such as AOCS Method Cd 8b-90. This method determines all substances, in terms of milliequivalents of peroxide per 1000 grams of test sample, that oxidize potassium iodide under the conditions of the test. The substances are generally assumed to be peroxides or other similar products of fat oxidation. The composition of the invention has increased stability, preferably oxidative stability, at temperatures ranging from 0 to 45° C.

Use of the Composition

In one embodiment of the invention the composition described herein above is to be used to increase stability of LC-PUFA in the production of a product comprising LC-PUFA, such as a nutritional composition, a nutritional complete formula, a dairy product, a beverage, a liquid drink, a soup, a dietary supplement, a meal replacement, a nutritional bar, a yoghurt, a fermented milk product, a milk based powder, a health care product, an enteral nutrition product, an infant formula, or an infant nutritional product.

It naturally follows that part of the invention also is a product comprising a LC-PUFA containing raw material in the form of the composition of the invention. Such LC-PUFA containing raw material may be a marine oil, a single cell oil, a vegetable oil, and/or an animal oil. It can also be products such as a nutritional composition, a nutritional complete formula, a dairy product, a beverage, a liquid drink, a soup, a dietary supplement, a meal replacement, a nutritional bar, a yoghurt, a fermented milk product, a milk-based powder, a health care product, an enteral nutrition product, an infant formula, or an infant nutritional product.

The skilled person will know which products to use the composition of the invention in. It is also known to the person skilled in the art that the product may further comprise a carbohydrate source, a protein source, a dietary fiber source and/or a further fat source.

The carbohydrate source may be any carbohydrate source suitable for use in nutritional compositions, for example digestible carbohydrates, such as maltodextrin, maltose, sucrose, lactose, glucose, fructose, corn syrup, corn syrup solids, rice syrup solids, starch, such as cereal starch, rice starch, corn starch and mixtures thereof.

The protein source may be any suitable dietary protein for example animal proteins (such as milk proteins, meat proteins and egg proteins), vegetable proteins (such as soy protein, wheat protein, rice protein and pea protein), mixtures of free amino acids or combinations thereof.

The dietary fiber (non-digestible carbohydrates) may also be present in a nutritional composition according to the present invention if desired. Numerous types of dietary fibers are available. For example oligosaccharides, such as fructo-oligosaccharides, galacto-oligosaccharides, xylo-oligosaccharides, fuco-oligosaccharides, and manno-oligosaccharides.

The final product may comprise an amount of LC-PUFA that corresponds to the intended use of the product. A typical food composition may comprise from 0.01 to 1.5 wt %, preferably from 0.05 to 1.0 wt %, such as from 0.05 to 0.5 wt %, such as from 0.5 to 1.5 wt %, such as from 0.5 to 1.0 wt % of LC-PUFA.

If the product is a nutritional composition, it preferably comprises other constituents, such as macro- and micronutrients, for example functional food ingredients. The nutritional composition is preferably designed to meet the nutritional needs of the particular human being or provide further benefits or functionalities. In one embodiment the nutritional composition is a "nutritional complete formula", that is it contains adequate nutrients to sustain healthy human life for extended periods. Preferably, the nutritional composition comprises vitamins and minerals.

If necessary, the product may contain emulsifiers and stabilizers. The emulsifier may be selected from the group consisting of for example mono- and di-glycerides, acetic acid esters of mono/di-glycerides, lactic acid esters of mono/di-glycerides, diacetyl tartaric acid esters of mono/di-glycerides, succinic acid esters of mono/di-glycerides, sorbitan esters, sucrose esters, polyglycerol esters, calcium stearoyl lactate and mixtures thereof.

It may further comprise further lipids typically from lipid sources that include for example milk fat, safflower oil, egg yolk lipid, canola oil, rapeseed oil, olive oil, coconut oil, palm oil, palm kernel oil, palm olein, soybean oil, sunflower oil, high oleic sunflower oil, flaxseed, corn oil. Medium chain triglycerides, which are defined herein as triglycerides comprising fatty acids with acyl chains of 6-12 carbon atoms (C6-C12) may also be included.

EXAMPLES

Example 1

The oxidative stability of the formulation (78 wt % Polar lipid fraction+22 wt % LC-PUFA containing fraction) was investigated in the dark at standard room temperature and pressure, and at 40° C. over a period of 12 months and compared with the oxidative stability of the Polar lipid fraction (100 wt % Polar lipid fraction+0 wt % LC-PUFA containing fraction, denoted PL fraction herein below) and a reference which had a similar fatty acid profile as the Polar lipid fraction only without phospholipids (0 wt % Polar lipid fraction+5 wt % LC-PUFA containing fraction, denoted Reference herein below).

The initial fatty acid composition, peroxide value and anisidine and changes in the fatty acid composition, peroxide value and anisidine value over 12 months are shown in Table 1 (room temperature) and Table 2 (40° C.).

TABLE 1

Changes in the fatty acid composition over 12 months at room temperature

| Fatty acid | 0 Months | | | 3 Months | | | 6 Months | | | 9 Months | | | 12 Months | | |
|---|---|---|---|---|---|---|---|---|---|---|---|---|---|---|---|
| (g/100 g fatty acids) | PL fraction | Formu-lation | Ref | PL fraction | Formu-lation | Ref | PL fraction | Formu-lation | Ref | PL fraction | Formu-lation | Ref | PL fraction | Formu-lation | Ref |
| C20:4 n-6 (ARA) | 1.9 | 9.1 | 1.5 | 1.7 | 8.3 | 1.5 | 1.7 | 8.3 | 1.3 | 1.6 | 8.6 | 1.2 | 1.5 | 8.2 | 1.1 |
| C22:6 n-3 (DHA) | 0.9 | 4.5 | 0.8 | 0.8 | 4.0 | 0.9 | 0.8 | 4.0 | 0.7 | 0.9 | 4.2 | 0.6 | 0.8 | 4.0 | 0.5 |
| Peroxide value | <0.1 | <0.1 | 1.1 | <0.1 | <0.1 | 0.3 | <0.1 | <0.1 | <0.1 | <0.1 | <0.1 | 50.0 | <0.1 | <0.1 | 22.1 |
| Anisidine Value | | | 2.0 | <0.5 | <0.5 | <0.5 | <0.5 | <0.5 | 4.4 | 0.9 | 5.1 | 11.7 | <0.5 | <0.5 | 8.8 |

TABLE 2

Changes in the fatty acid composition over 12 months at 40° C.

| Fatty acid | 0 Months | | | 3 Months | | | 6 Months | | | 9 Months | | | 12 Months | | |
|---|---|---|---|---|---|---|---|---|---|---|---|---|---|---|---|
| (g/100 g fatty acids) | PL Fraction | Formu-lation | Ref | PL Fraction | Formu-lation | Ref | PL Fraction | Formu-lation | Ref | PL Fraction | Formu-lation | Ref | PL Fraction | Formu-lation | Ref |
| C20:4 n-6 (ARA) | 1.9 | 9.1 | 1.5 | 1.6 | 8.8 | 1.1 | 1.5 | 8.3 | 1.1 | 1.6 | 7.9 | 0.9 | 1.6 | 7.8 | 1.0 |
| C22:6 n-3 (DHA) | 0.9 | 4.5 | 0.8 | 0.8 | 4.2 | 0.5 | 0.7 | 3.9 | 0.5 | 0.8 | 3.8 | 0.4 | 0.8 | 3.8 | 0.4 |
| Peroxide value | <0.1 | <0.1 | 1.1 | <0.1 | <0.1 | 2.3 | <0.1 | <0.1 | 28.4 | <0.1 | <0.1 | 75.3 | <0.1 | <0.1 | 38.1 |
| Anisidine Value | | | 2.0 | <0.5 | <0.5 | <0.5 | <0.5 | <0.5 | 16.2 | <0.5 | 5.4 | 51.2 | <0.5 | 4.4 | 23.5 |

Changes in Fatty Acid Composition Over 12 Months

At time point 0, the major PUFA in the samples were ARA (1.5-9.1 g/100 g fatty acids) and DHA (0.8-4.5 g/100 g fatty acids). After 12 months at room temperature, the reference showed the largest decrease in ARA from 1.5 to 1.1 g/100 g fatty acids (corresponding to 72.7% of initial ARA) and DHA from 0.8 to 0.5 (corresponding to 69.7% of initial DHA). While the samples containing phospholipids showed a lower decrease. The formulation showed a decrease in ARA from 9.1 to 8.2 (90.6% of initial ARA) and DHA from 4.5 to 4.0 (88.3% of initial DHA). The PL fraction showed a decrease in ARA of 1.9 to 1.5 (80.6% of initial ARA) and DHA from 0.9 to 0.8 (80.6% of initial DHA). The concentration as a percentage of the initial value over 12 months at room temperature is presented in FIG. 1 (ARA) and FIG. 2 (DHA). The percentage of the initial value (FIGS. 1, 2, 3, 4) is calculated using the unrounded numbers (Table 1 and 2).

The concentration as a percentage of the initial value over 12 months is presented in FIG. 1 (ARA) and FIG. 2 (DHA). After 12 months at 40° C., the reference showed the largest decrease in ARA from 1.5 to 1 g/100 g fatty acids (corresponding to 66.0% of initial ARA) and DHA from 0.8 to 0.4 (corresponding to 50.0% of initial DHA). While the samples containing phospholipids showed a lower decrease, the formulation showed only a decrease in ARA from 9.1 to 7.8 (85.7% of initial ARA) and DHA from 4.5 to 3.8 (84.1% of initial DHA). In comparison the PL fraction showed a decrease in ARA of 1.9 to 1.6 (82.2% of initial ARA) and DHA from 0.9 to 0.8 (82.8% of initial DHA). The concentration as a percentage of the initial value over 12 months at 40° C. is presented in FIG. 3 (ARA) and FIG. 4 (DHA).

Changes in Peroxide Value Over 12 Months

The peroxide value of the reference at room temperature reached 22.1 meq $O_2$/kg after 12 months, with peak level of 50 meq $O_2$/kg after 9 months, while the peroxide value of both the formulation and the PL fraction remained at <0.1 meq $O_2$/kg (FIG. 5 and Table 1). The peroxide value of the reference at 40° C. reached 38.1 meq $O_2$/kg after 12 months, with peak level of 75.3 meq $O_2$/kg after 9 months, while the peroxide value of both the formulation and the PL fraction remained at <0.1 meq $O_2$/kg (FIG. 6 and Table 2). It is a well understood phenomena that over the time course of oxidation, the hydroperoxide concentration (as determined by the peroxide value) will go through a maximum once the hydroperoxide decomposition is greater than the hydroperoxide formation.

Changes in Anisidine Value Over 12 Months

The anisidine value of the reference at room temperature reached 8.8 after 12 months. While the anisidine value of the formulation and the PL fraction at room temperature reached lower levels, <0.5 and <0.5 respectively after 12 months (FIG. 7 and Table 1). The anisidine value of the reference at 40° C. reached 23.5 after 12 months. While the anisidine value of the formulation and the PL fraction at 40° C. reached lower levels, 4.4 and <0.5 respectively after 12 months (FIG. 8 and Table 2).

CONCLUSION

The reference shows a larger decrease in ARA and DHA content than both the formulation and the PL fraction after 12 months at both room temperature and 40° C. Next to that the increase in peroxide value and anisidine value was larger for the reference than the formulation and the PL fraction after 12 months at both room temperature and 40° C. The reference contains similar amounts of LC-PUFA as the PL fraction, but does not contain phospholipids. As the reference showed lower stability, this indicates that the phospholipids in the PL fraction have a stabilizing effect on the LC-PUFA. Next to that, the results on the formulation, which is a combination of 78% Polar lipid fraction and 22% LC-PUFA containing fraction, resulted in a higher stability than would have been expect as common knowledge when no PL fraction would have been added to the LC-PUFA containing fraction. To conclude, the PL fraction has a stabilizing effect on LC-PUFA's.

The invention claimed is:

1. A composition comprising a polar lipid fraction and a LC-PUFA containing fraction, wherein, in the composition:

a. 73 to 83 wt % is a polar lipid fraction containing 28 to 38 wt % of at least one phospholipid;

b. 17 to 27 wt % is a LC-PUFA containing fraction containing 45 to 55 wt % LC-PUFA; and wherein said composition comprises 20 to 32 wt % of the at least one phospholipid.

2. The composition according to claim 1, wherein the at least one phospholipid is in the polar lipid fraction and is selected from the group consisting of vegetable phospholipids, marine phospholipids, animal phospholipids, and single cell organism phospholipids, or mixtures thereof.

3. The composition according to claim 2, wherein the polar lipid fraction comprises vegetable phospholipids obtained from soybean, sunflower, or rapeseed.

4. The composition according to claim 2, wherein the polar lipid fraction comprises marine phospholipids obtained from krill or fish.

5. The composition according to claim 2, wherein the polar lipid fraction comprises animal phospholipids, wherein the animal phospholipids are egg phospholipids obtained from chicken and/or duck and/or milk phospholipids obtained from cow and/or goat.

6. The composition according to claim 2, wherein the polar lipid fraction comprises single cell organism phospholipids obtained from algae, bacteria, or fungus.

7. The composition according to claim 5, wherein the animal phospholipids are egg phospholipids obtained from chicken.

8. The composition according to claim 1, wherein said LC-PUFA containing fraction comprises LC-PUFA selected from the group consisting of Eicosadienoic acid, Eicosatrienoic acid, Eicosapentaenoic acid, Arachidonic acid, Docosadienoic acid, Docosatetraenoic acid, Docosapentaenoic acid, and Docosahexaenoic acid.

9. The composition according to claim 1, wherein said LC-PUFA containing fraction comprises LC-PUFA selected from the group consisting of Eicosapentaenoic acid, Arachidonic acid, and Docosahexaenoic acid.

10. The composition according to claim 1, wherein said composition also comprises of cholesterol, free fatty acids, and/or anti-oxidants or additives.

11. The composition according to claim 1, wherein the LC-PUFA contained in said LC-PUFA containing fraction has increased oxidative stability.

12. The composition according to claim 11, wherein said composition is stable at temperatures ranging from 0 to 45 degrees Celsius.

13. The composition according to claim 1, wherein said composition further comprises an antioxidant selected from the group consisting of Alphatocopherol, mixed tocopherols, ascorbyl palmitate, rosemary extract, and citric acid.

14. The composition according to claim 13, wherein said mixed tocopherols are a mixture of alpha-, beta-, gamma, and delta-tocopherol.

15. The composition according to claim 1, wherein said composition is in liquid, semi-liquid, or powder form.

16. The composition according to claim 1, wherein the oxidative stability of LC-PUFA is increased in products comprising LC-PUFA.

17. A product comprising a composition according to claim 1, wherein the product is a LC-PUFA containing raw material.

18. The composition of claim 16, wherein the products comprising LC-PUFA are a nutritional composition, a nutritional complete formula, a dairy product, a beverage, a liquid drink, a soup, a dietary supplement, a meal replacement, a nutritional bar, a yoghurt, a fermented milk product, a milk based powder, a health care product, an enteral nutrition product, an infant formula, or an infant nutritional product.

19. The product of claim 17, wherein the product is a marine oil, a single cell oil, a vegetable oil, an animal oil, or a nutritional composition, a nutritional complete formula, a dairy product, a beverage, a liquid drink, a soup, a dietary supplement, a meal replacement, a nutritional bar, a yoghurt, a fermented milk product, a milk based powder, a health care product, an enteral nutrition product, an infant formula, or an infant nutritional product.

* * * * *